Jan. 22, 1957  M. K. BABAIAN  2,778,468
OVERLOAD RELEASE CLUTCHES
Filed Nov. 18, 1952  3 Sheets-Sheet 3
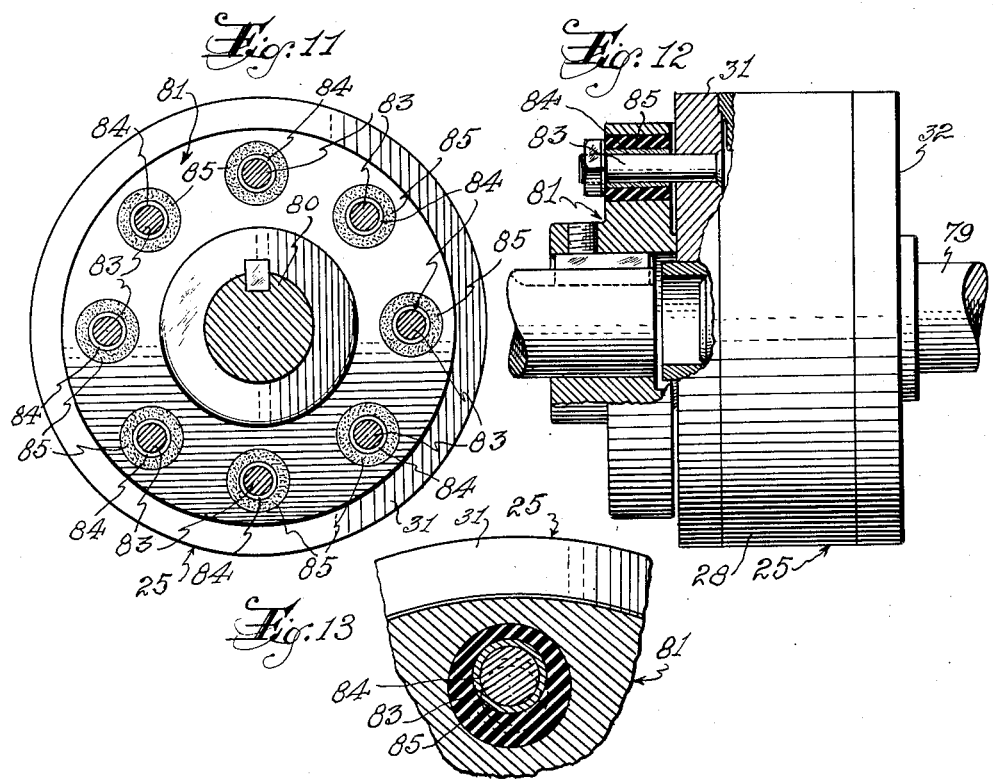

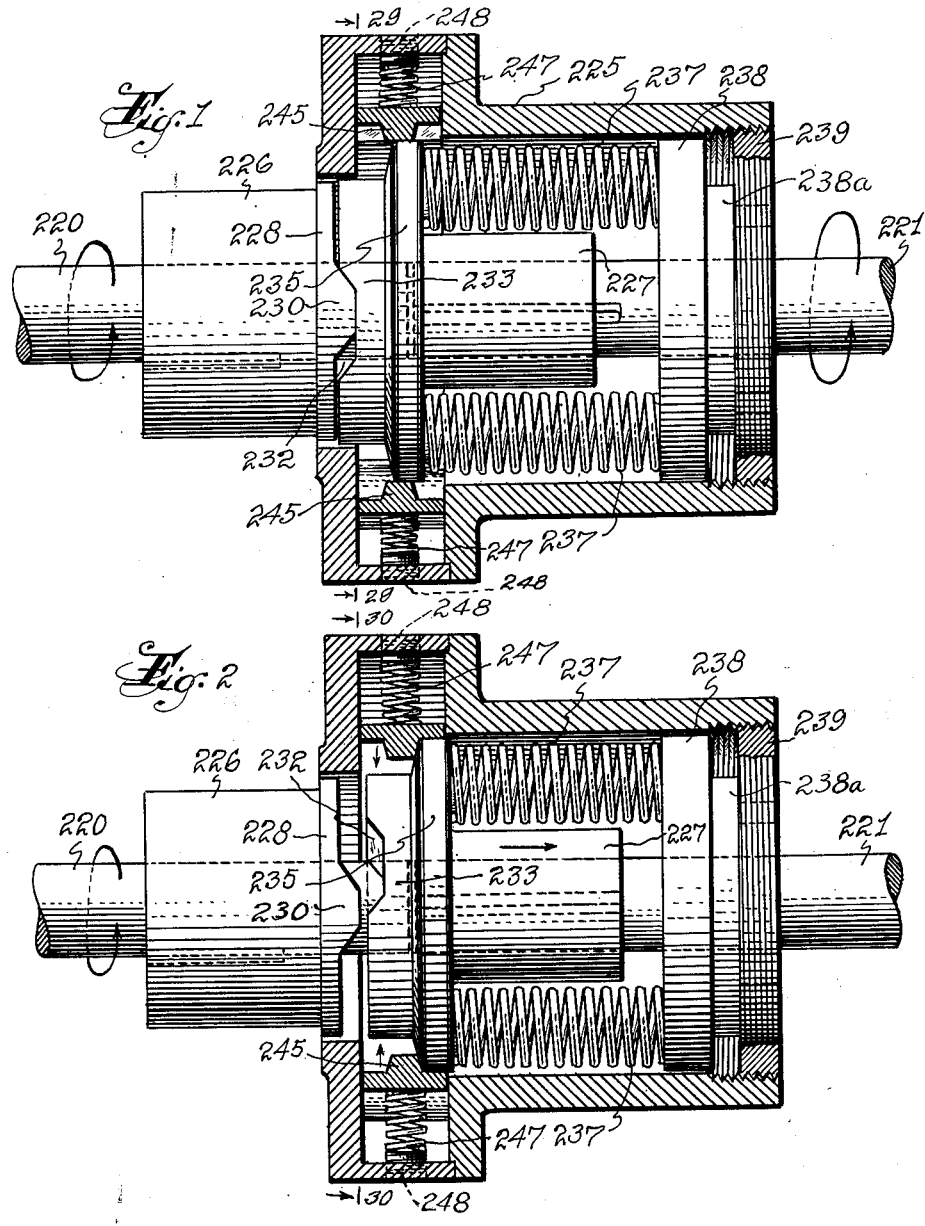

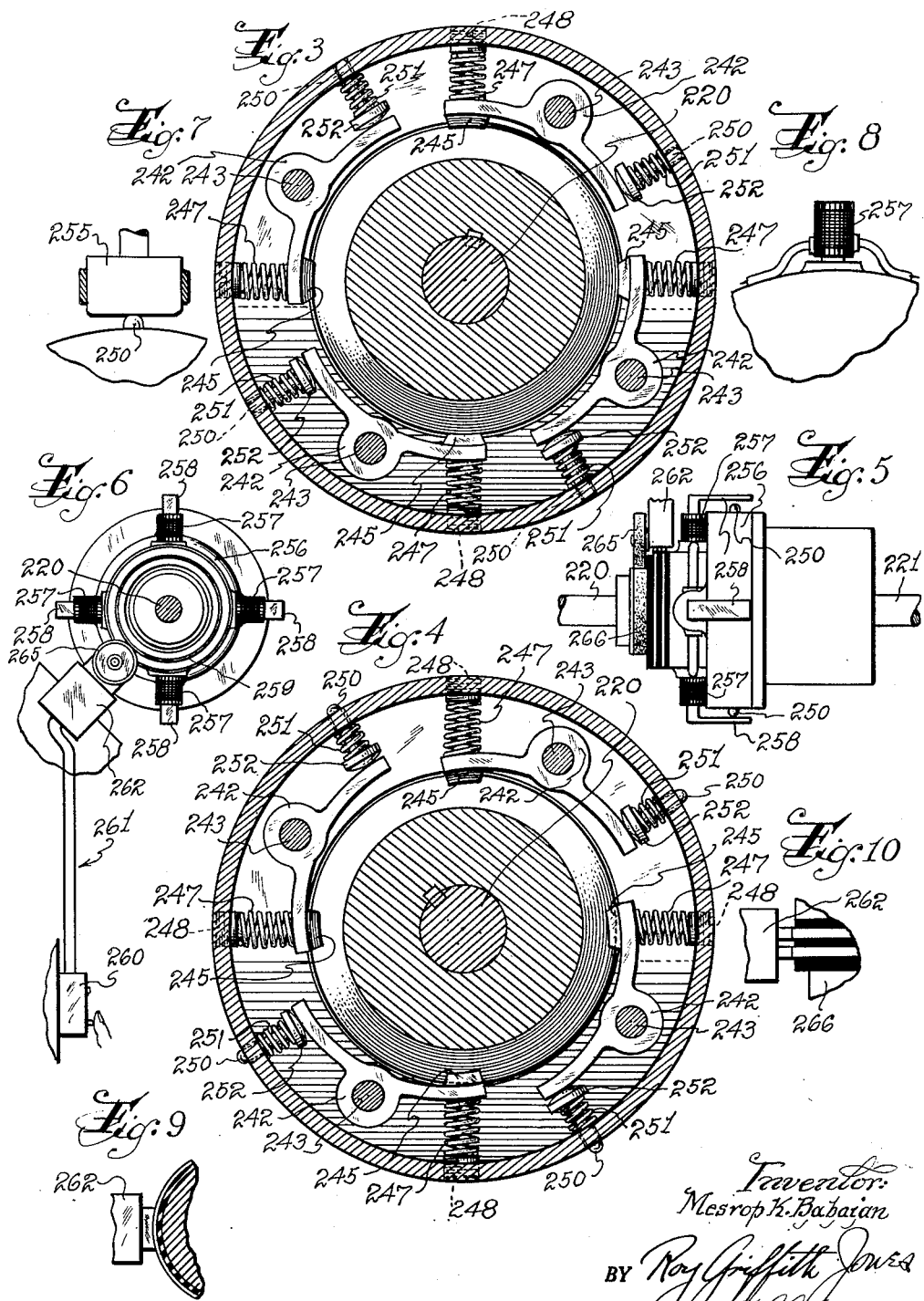

United States Patent Office 2,778,468
Patented Jan. 22, 1957

2,778,468

OVERLOAD RELEASE CLUTCHES

Mesrop K. Babaian, Newark, N. J., assignor, by mesne assignments, to Centric Clutch Company, a corporation of New Jersey Application November 18, 1952, Serial No. 321,147

2 Claims. (Cl. 192—56)

This invention relates to overload release clutches.

One of the features of my present invention is the provision of means, in a clutch of the character described, whereby the clutch automatically releases on overload regardless of whether it rotates in the clockwise or counter-clockwise direction and without the necessity of re-arranging any part of the clutch.

Another feature of the invention is the provision of means enabling a clutch of given size to carry a heavier load, whereby a smaller and therefore less expensive clutch may be employed for a given load.

A further feature lies in the provision of a switch which automatically operates to shut off a power source, as an electric motor, for example, when an overload occurs.

Other features will be apparent to those skilled in the art from a reading of the following disclosure.

Referring to the drawings for a detailed description of the invention;

Fig. 1 shows an overload release clutch according to the invention, wherein the clutch is actuated on overload by mechanism at the side thereof;

Fig. 2 is a view similar to Fig. 1 but shows the parts in declutched or released position;

Fig. 3 is a section taken approximately on the line 29—29 of Fig. 1, showing the mechanism in locking or normal operative position;

Fig. 4 is a section approximately on line 30—30 of Fig. 2;

Fig. 5 is a front view of the clutch of Figs. 3 and 4, with means whereby the pawls may be electrically reset to a locking position, after removal of an overload;

Fig. 6 is an enlarged end view of Fig. 5, plus an electric switch circuit;

Fig. 7 shows a means for manually resetting a pawl;

Fig. 8 shows a solenoid employed to reset a pawl;

Fig. 9 is a side view of a part of Fig. 5;

Fig. 10 is a plan view of Fig. 9;

Fig. 11 is an elevational view, partly in section, of a clutch in combination with a flexible coupling;

Fig. 12 is a side elevation of Fig. 11 looking at the side of the flexible coupling;

Fig. 13 is an enlarged fragmentary section showing essentially a condition of the flexible coupling.

Figs. 1, 2, 3 and 4 show a lateral type clutch, Figs. 1 and 3 showing the normal operating position of the parts and Figs. 2 and 4 showing the parts in overload or declutched position. In these views, a driving shaft 220 drives shaft 221 through the medium of the clutch. In this clutch, the casing, as well as the mechanism therein, rotates, as is necessary for certain applications, and this is one way in which the present clutch is distinguished from the clutch shown in Patent #2,167,749 issued to Henry P. Grohn, August 1, 1939, in which the casing of the clutch is stationary. The present clutch has a casing 225 and the following described parts. A driving tubular member or clutch element 226 is keyed against rotation and against movement lengthwise of said drive shaft 220. Another clutch element 227, which coacts with clutch element 226, is keyed to driven shaft 221 against rotation relative to its shaft but to allow lengthwise sliding movement thereon. Element 226 has a head 228 at its inner end, and this head has two detents 230 oppositely or diametrically disposed, and having oppositely inclined sides, and which are adapted to fit into correspondingly formed recesses 232. The latter recesses are formed in the outer face of the head 233 of clutch element 227. Shaft 220 terminates within head 233 and has the latter as a bearing. Back of head 233, and contiguous therewith, is a collar 235, which is formed as an integral part of clutch member 227 and is of greater diameter than said head 233, the face of said collar adajcent head 233 being inclined downwardly toward the latter head. Clutch element 227 is normally urged into engagement with clutch element 226 by 4 compressed, load or load-resistant, coiled springs 237 disposed 90° apart, one end of each pressing against collar 235 and the other ends against a plate 238 which is slidably mounted on shaft 221. A reduced outer part 238a of said plate bears against a plug 239 which threadedly engages one end of the casing and is used to adjust the compression of said springs. As shown in Figs. 3 and 4, this form of clutch is provided with 4 pawls 242, spaced 90° apart, each pawl pivoted at its middle on a stub 243, and each having at one end a detent 245, which detents normally rest on the periphery of the collar 235 but disposed more toward the inclined face of the same than toward the outer face, as clearly shown in Figs. 1 and 2. Said pawls are pressed at their detent ends, against the periphery of the collar 235 by compressed coiled springs 247, the latter being adjustable at their outer ends by threaded plugs 248. When an overload occurs, clutch element 227 is moved to the right on shaft 221, being slidably mounted thereon as previously stated, which movement means a disengagement of element 227 from element 226. Detents 245 are then pressed inwardly by coils 247 onto the inclined inner face of head 235 and thereby move element 227 somewhat farther to the right to effect a space separation of the clutching elements 226 and 227, as shown in Fig. 2. The clutch elements being disengaged, the casing, and interior clutch elements mounted on the driven shaft, cease rotating. To reset or reengage the clutch elements, reset pins 250 are pressed inwardly against said pawls, at the end portions of the latter opposite the detent-carrying ends. Said pins are held in position against said pawls by a light pressure exerted by springs 251 which are coiled around the pins and press at one end against heads 252 on the inner ends of the pins and at their other ends against the inner periphery of the casing. It will be seen from Fig. 4 that the outer ends of the pins extend beyond the outer periphery of the casing when the clutch elements are disengaged; when engaged, the outer ends of the pins are slightly within the outer periphery, as shown in Fig. 3. Fig. 7 shows a structure 255 which may if desired be placed opposite each of said reset pins to push said pins inwardly to reset them, said structure being movable.

Figs. 5 and 6 show a clutch 256 of the type shown in Figs. 1, 2, 3 and 4, and also show electrical means for resetting, after an overload is removed, pawls of the type shown in Figs. 3 and 4. Said means comprises a set of 4 solenoids 257, one opposite each of said reset pins, and adapted, when energized, to push the pins inwardly. Said solenoids are mounted on the periphery of the clutch and have cores 258 which move against said pins. The solenoids are electrically connected so that current flows through all of them when a circuit is closed, and when closed, the mentioned cores are pulled inwardly to push inwardly said pins as aforesaid. Power is fed to the solenoids through slip rings 259 rotating with the clutch and slidably connected to the solenoid circuit, said circuit including a switch box 260 and lines 261 leading therefrom to rollers 263 and to said slip rings. A magneto, contained within box 262, derives power from the mentioned slip rings as shown in Figs. 5, 9 and 10 and is therefore actuated when switch 260 is closed. The actuation of the magneto, simultaneously with the solenoids, turns the motor shaft, as shown in Fig. 5, to effect a clutching registration of clutching elements 226 and 227, it being understood that the reset pins have been pushed inwardly by the solenoid cores; detents 245 are therefore raised and thereby allow element 227 to be moved by pressure of load springs 237, into coupling relation to element 226. As best shown in Fig. 5, the mentioned turning of the shaft by the magneto is effected through two peripherally engaging friction wheels 265 and 266, the former of which is turned by the magneto and the latter by the shaft 220 on which it is mounted.

Figs. 11 and 12 show the application of a clutch to a flexible coupling wherein a driving shaft 79 extends through and is keyed to a clutch 25, and is connected to a driven shaft 80 through a flexible coupling 81. The coupling 81 is keyed to the driven shaft and is secured to a side cover of the clutch casing by bolts 83 which are encircled at their outer ends by bronze bushings 84 and outside of these by rubber shock absorbing tubes 85. The enlarged fragmentary view of Fig. 13 shows a rubber shock absorber compressed on one side due to temporary misalignment of the shafts as occurs in starting for example.

What is claimed is:

1. An overload release clutch for transmitting power between a first shaft and a second shaft comprising a rotatable casing, a first clutching member mounted on said first shaft, a second clutching member in said casing slidably mounted on said second shaft and rotatable therewith, one of said clutching members having teeth formed on an end thereof, the other clutching member having notches adapted to receive said teeth, said teeth being adapted to be moved out of said notches on overload, spring means normally holding said second clutching member in engagement with said first clutching member, and holding means for holding one of said members disengaged from the other on overload, said holding means comprising spring pressed pawls mounted in said casing and pivotable within said casing in a plane perpendicular to the axis of rotation of said second shaft, said pawls having detents, and a collar on said second member, said collar having a substantially conical surface, and the detents of said pawls being positioned to engage said conical surface on overload; in combination with resiliently mounted pins adapted to be moved outwardly of said casing by said pawls on overload to signal disengagement of said clutch, and to be moved inwardly to reset said pawls.

2. The overload release clutch claimed in claim 1 and comprising an electric switch positioned adjacent said casing and operable by said pins when said pins are moved outwardly of said casing.

References Cited in the file of this patent

UNITED STATES PATENTS

| | | |
|---|---|---|
| 1,165,066 | Broughton | Dec. 21, 1915 |
| 1,548,427 | Aldeen | Aug. 4, 1925 |
| 1,745,738 | Carter, Jr. | Feb. 4, 1930 |
| 1,858,074 | Damerell | May 10, 1932 |
| 2,084,380 | Bragg et al. | June 22, 1937 |
| 2,167,749 | Grohn | Aug. 1, 1939 |
| 2,259,824 | Lowder | Oct. 21, 1941 |
| 2,320,900 | Walz | June 1, 1943 |
| 2,446,703 | Honigman | Aug. 10, 1948 |
| 2,502,234 | Rosen | Mar. 28, 1950 |
| 2,502,461 | Kane | Apr. 4, 1950 |
| 2,555,929 | Jensen et al. | June 5, 1951 |

FOREIGN PATENTS

| | | |
|---|---|---|
| 554,046 | Germany | July 1, 1932 |
| 648,026 | Germany | July 26, 1937 |
| 384,333 | France | Jan. 31, 1908 |
| 495,160 | France | June 19, 1919 |